United States Patent
Nakagawa

(10) Patent No.: US 10,295,666 B2
(45) Date of Patent: May 21, 2019

(54) OBJECT DETECTION DEVICE

(71) Applicant: Panasonic Intellectual Property Management Co., Ltd., Osaka (JP)

(72) Inventor: Takuma Nakagawa, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 146 days.

(21) Appl. No.: 15/509,584

(22) PCT Filed: Oct. 1, 2015

(86) PCT No.: PCT/JP2015/004998
§ 371 (c)(1),
(2) Date: Mar. 8, 2017

(87) PCT Pub. No.: WO2016/051805
PCT Pub. Date: Apr. 7, 2016

(65) Prior Publication Data
US 2017/0285168 A1 Oct. 5, 2017

(30) Foreign Application Priority Data
Oct. 3, 2014 (JP) .................................. 2014-205012

(51) Int. Cl.
*G08G 1/16* (2006.01)
*G01S 15/93* (2006.01)
(Continued)

(52) U.S. Cl.
CPC ............ *G01S 15/931* (2013.01); *B60R 21/00* (2013.01); *G01S 5/22* (2013.01); *G01S 15/878* (2013.01); *G01S 15/93* (2013.01); *G08G 1/16* (2013.01)

(58) Field of Classification Search
CPC .......... B60R 21/00; G08G 1/16; G08G 1/166; B60W 2420/42; B60W 2420/52;
(Continued)

(56) References Cited

U.S. PATENT DOCUMENTS

| 5,574,426 A | * | 11/1996 | Shisgal | B60Q 9/007 180/271 |
| 8,194,132 B2 | * | 6/2012 | Dayan | B60K 35/00 348/148 |
| 8,823,550 B2 | * | 9/2014 | Pampus | B60Q 9/006 340/3.41 |

FOREIGN PATENT DOCUMENTS

JP 2000-346936 12/2000

OTHER PUBLICATIONS

International Search Report of PCT application No. PCT/JP2015/004998 dated Dec. 15, 2015.

* cited by examiner

*Primary Examiner* — Dalena Tran
(74) *Attorney, Agent, or Firm* — Greenblum & Bernstein, P.L.C.

(57) ABSTRACT

An object detection device of the present disclosure includes three reception units for receiving reflected waves resulting from reflection of a transmission wave by an object within a detection range, and a determination unit for determining presence or absence of an object to be avoided based on outputs of the three reception units. The determination unit calculates first coordinates and second coordinates at which an object is estimated to be present, based on reception times from when a transmission wave is transmitted until reflected waves are received by the three reception units, and determines whether or not the object needs to be avoided, based on a distance between the first coordinates and the second coordinates.

5 Claims, 4 Drawing Sheets

(51) Int. Cl.
*B60R 21/00* (2006.01)
*G01S 5/22* (2006.01)
*G01S 15/87* (2006.01)

(58) Field of Classification Search
CPC ............ B60W 2520/16; B60W 30/09; B60W 50/045; G01S 13/867; G01S 13/87; G01S 15/878; G01S 15/93; G01S 15/931; G01S 17/87; G01S 17/936; G01S 2013/9364; G01S 2013/9367; G01S 5/22
USPC .................. 701/301, 400, 411; 700/250, 253
See application file for complete search history.

OBJECT DETECTION DEVICE

This application is a U.S. national stage application of the PCT International Application No. PCT/JP2015/004998 filed on Oct. 1, 2015, which claims the benefit of foreign priority of Japanese patent application 2014-205012 filed on Oct. 3, 2014, the contents all of which are incorporated herein by reference.

TECHNICAL FIELD

The present disclosure relates to an object detection device.

BACKGROUND ART

A conventional object detection device is mounted in a vehicle, and detects an object by transmitting a transmission wave to a detection range and receiving a reflected wave resulting from the reflection by the object within the detection range. The above object detection device is used for an automatic control such as automatically applying brakes, for example, when an object has been detected.

For example, it may not be necessary to avoid collision against an object low in height, such as a curbstone, which can be driven over by a vehicle. Accordingly, in order to avoid incorrect detections such as detection of the low-height object, an object detection device mounted in a vehicle is designed so that low objects to a certain degree are not included within a detection range (for example, PTL 1). Specifically, the transmission direction of a transmission wave is set to a horizontal direction, and when the vehicle body is inclined and there is a possibility that a low-height object as mentioned above is included within the detection range, the detection range is reduced by decreasing the gain of the reception of a reflected wave.

CITATION LIST

Patent Literature

PTL 1: Unexamined Japanese Patent Publication No. 2000-346936

SUMMARY OF THE INVENTION

An object detection device according to the present disclosure includes a transmission unit for transmitting a transmission wave to a detection range, a first reception unit for receiving a reflected wave resulting from reflection of the transmission wave transmitted from the transmission unit by an object within the detection range, a second reception unit for receiving a reflected wave resulting from reflection of the transmission wave transmitted from the transmission unit by the object within the detection range, and a third reception unit for receiving a reflected wave resulting from the reflection of the transmission wave transmitted from the transmission unit by the object within the detection range. The object detection device further includes a determination unit for determining presence or absence of an object to be avoided, based on outputs of the first reception unit, the second reception unit, and the third reception unit.

The determination unit calculates first coordinates at which the object is estimated to be present, based on a first reception time from when the transmission unit transmits a transmission wave until a reflected wave is received by the first reception unit, and a second reception time from when the transmission unit transmits a transmission wave until a reflected wave is received by the second reception unit, and calculates second coordinates at which the object is estimated to be present, based on the second reception time, and a third reception time from when the transmission unit transmits a transmission wave until a reflected wave is received by the third reception unit.

Further, the determination unit compares a distance between the first coordinates and the second coordinates with a prescribed reference distance, determines that the object needs to be avoided in a case where the distance between the first coordinates and the second coordinates is less than the reference distance, and determines that an object is not the object to be avoided in a case where the distance between the first coordinates and the second coordinates is equal to or larger than the reference distance.

DESCRIPTION OF EMBODIMENT

Prior to description of the present exemplary embodiment, the problem of the above-mentioned conventional technique will be described.

In the conventional object detection device, the distance by which an object can be detected (hereinafter, referred to as a "detection distance") is shortened when the detection range is reduced.

An object of the present disclosure is to provide an object detection device that can suppress reduction of the detection distance, while reducing occurrence of incorrect detections.

Hereinafter, the preferred embodiment of the present disclosure will be described with reference to the drawings.

(A Case where the Detected Object is a Ball)

First, a case where an object that reflects a transmission wave output from the object detection device of the present exemplary embodiment is a ball, will be described with reference to the drawings.

Figure 1:
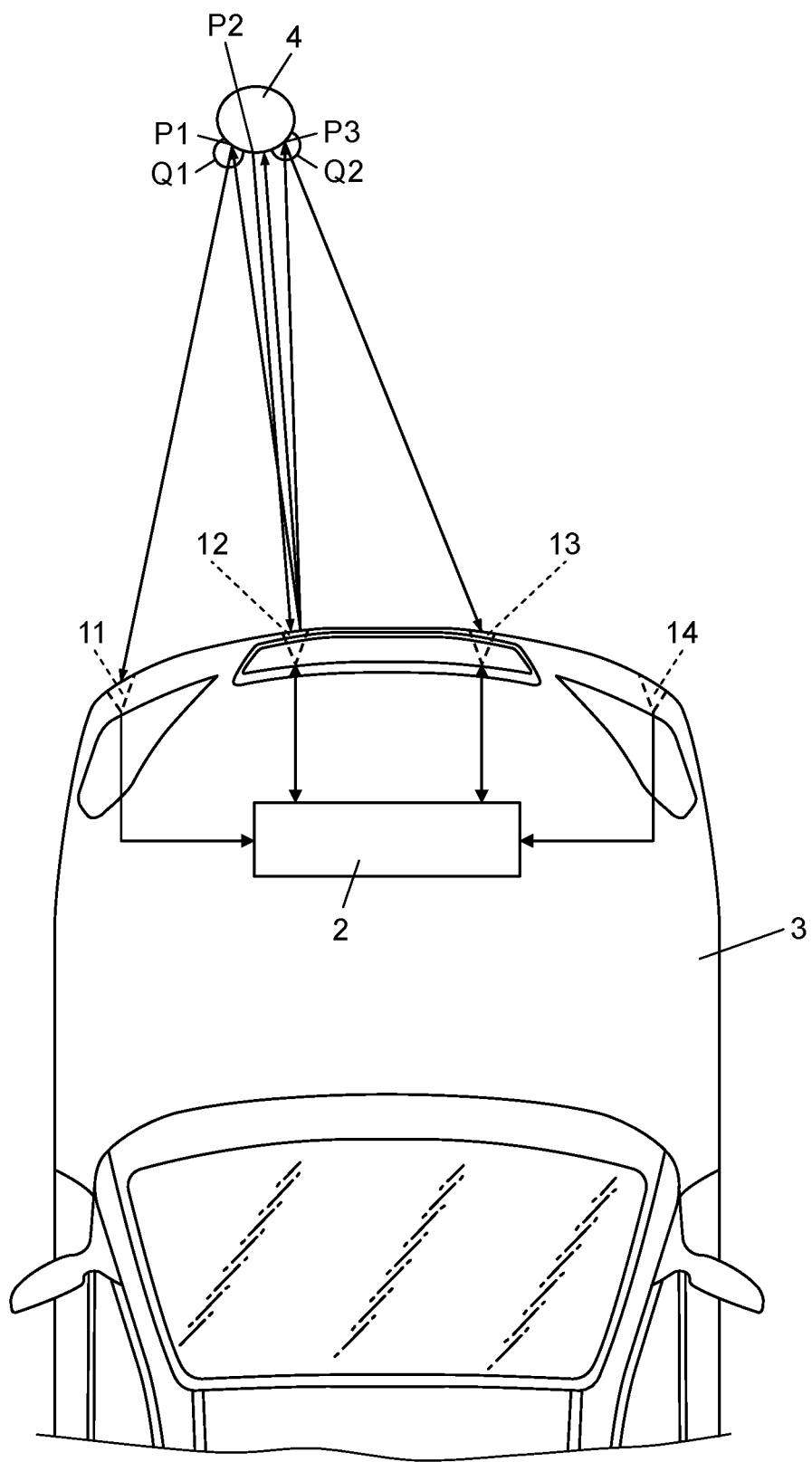
FIG. 1 is a diagram for describing an operation of an object detection device according to an exemplary embodiment.
Figure 2:
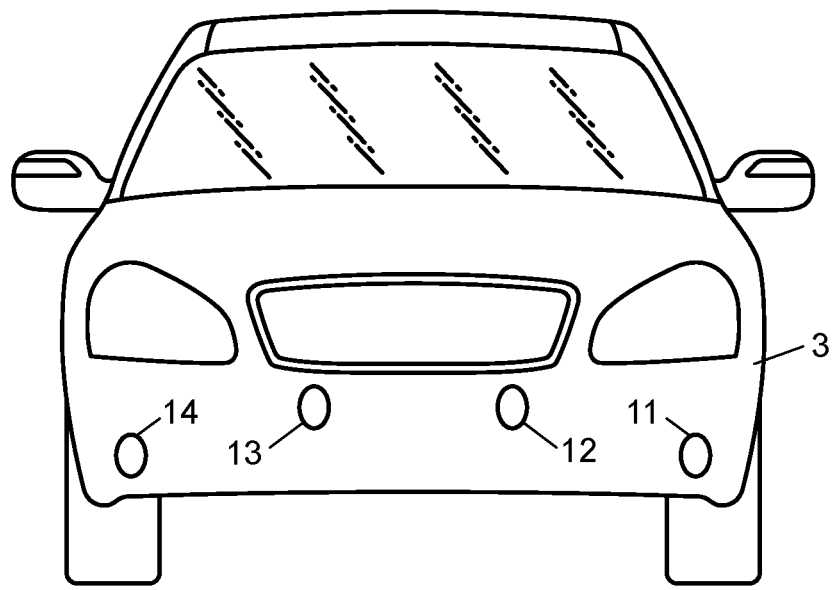
FIG. 2 is a diagram for describing arrangement of the object detection device according to the exemplary embodiment.
Figure 3:
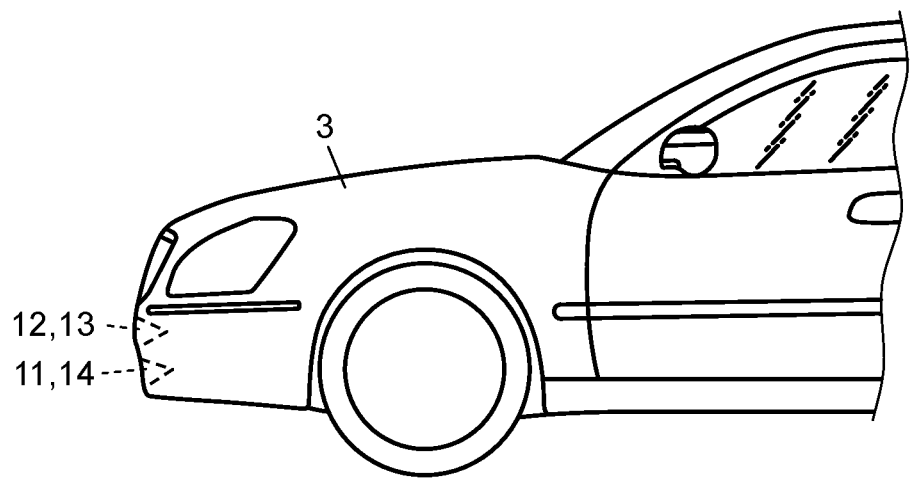
FIG. 3 is a diagram for describing the arrangement of the object detection device according to the exemplary embodiment.

FIG. 1 is a diagram for describing an operation of an object detection device according to an exemplary embodiment of the present disclosure. FIG. 2 is a diagram of vehicle 3 seen from the front side, and shows arrangement of reception units 11 to 14. FIG. 3 is a diagram of vehicle 3 seen from the left side, and shows the arrangement of reception units 11 to 14.

As shown in FIG. 1, the object detection device of the present exemplary embodiment has reception units 11 to 14, and a determination unit, disposed on the front side of vehicle 3. Each of reception units 11 to 14 outputs a voltage value corresponding to strength of an incident ultrasonic wave. Determination unit 2 determines presence or absence of object 4 which needs to be avoided (hereinafter, referred to as an "obstacle"), based on the outputs of reception units 11 to 14. Note that, in the present exemplary embodiment, object 4 to be determined as unnecessary to avoid (that is, not an obstacle) is set to low-height object 4 to a degree capable of being driven over by vehicle 3, such as a low step, a road stud, or a curbstone, with a height of approximately 10 cm.

Each of reception units 11 to 14 has a piezoelectric element (not shown), and a signal processing circuit (not shown). The signal processing circuit performs suitable signal processing, such as amplification or noise removal, by being interposed between the piezoelectric element and determination unit 2.

The piezoelectric elements of reception units 11 to 14 are fixed by being arranged in a left-right direction on the front side of vehicle 3. Note that, while these piezoelectric elements are fixed on the front side in the present exemplary embodiment, the piezoelectric elements may be fixed on the rear side. Determination unit 2 determines the presence or absence of an obstacle in a prescribed detection range formed in front (or behind) vehicle 3. Hereinafter, the left-right direction will be described based on FIG. 1. Moreover, the up-down direction of FIG. 1 is referred to as the front-rear direction of vehicle 3. The direction in which the surface that receives a reflected wave is facing, and in which the detection range is formed (upwards in FIG. 1), in reception units 11 to 14 is referred to as the front.

Each of reception units 11 to 14 is disposed at a position higher than the height of object 4 capable of being driven over by vehicle 3 (that is, not considered as an obstacle).

Moreover, out of reception units 11 to 14, reception units 12 and 13 disposed in the center have a driving circuit for driving the piezoelectric element in accordance with a signal input from determination unit 2. Reception units 12 and 13 function as transmission units for transmitting a transmission wave to the detection range.

Moreover, as shown in FIG. 2 and FIG. 3, reception units 12 and 13 are disposed at positions higher than reception units 11 and 14.

In the present exemplary embodiment, the reception units capable of being used as transmission units are the reception units capable of being disposed in the center out of the three reception units for driving, specifically, reception unit 12 and reception unit 13. However, only one reception unit is used at a time as a transmission unit. That is, only one of reception unit 12 and reception unit 13 is used at a time as a transmission unit.

Moreover, only three of reception units 11 to 14 are used at a time. That is, when reception unit 12 is used as a transmission unit, reception unit 14 is not used, and reception units 11 to 13 are used, as reception units. On the other hand, when reception unit 13 is used as a transmission unit, reception unit 11 is not used, and reception units 12 to 14 are used as reception units.

Note that, when reception unit 12 is used as a transmission unit, the detection range is formed inclined more to the left than when reception unit 13 is used as a transmission unit.

Note that, FIG. 1 shows an example where reception unit 12 is used as a transmission unit.

Determination unit 2 has, for example, a storage unit (not shown) in which programs and data are stored, and a micro controller that operates in accordance with the programs stored in the storage unit. Determination unit 2 may be integrated in one chip. Moreover, a part of each of reception units 11 to 14 (for example, the signal processing circuit) may be integrated in one chip along with determination unit 2.

Next, the operation of determination unit 2, in the case where reception unit 12 is used as a transmission unit, will be described. At this time, reception units 11 to 13 are used as reception units.

Determination unit 2 controls reception unit 12 so as to periodically transmit pulse-type transmission waves (ultrasonic waves). The duration of a transmission wave is shortened to the extent that reverberations in reception unit 12 are sufficiently attenuated before a reflected wave is received from the closest distance estimated from when transmission has started. Moreover, the transmission interval of the transmission waves is longer than the time until a reflected wave is received from an estimated longest distance, and is as short as possible.

Moreover, for each of reception units 11 to 13, determination unit 2 compares an output voltage with a prescribed reception threshold, and sets a timing at which the output voltage is equal to or higher than the reception threshold as a reception timing at which a reflected wave has been received. Note that, since reverberations are generated directly after the transmission of a transmission wave in reception unit 12, which is also utilized as a transmission unit, the output of reception unit 12 is ignored until a time has elapsed to the extent that the reverberations have sufficiently attenuated after the transmission of a transmission wave. In addition, for each of reception units 11 to 13, determination unit 2 measures a time from an immediate timing at which a transmission wave has been transmitted until the above reception timing (hereinafter, referred to as a "reception time"). By multiplying the speed of sound by the reception time, a sum of the distance from a point P1 at which the received reflected wave has been reflected (hereinafter, referred to as a "reflection point") to the transmission unit (that is, reception unit 12) and the distance from reception unit 11 that receives the reflected wave to reflection point P1 is obtained. Similarly, a sum of the distance from reflection point P2 to the transmission unit and the distance from reception unit 12 that receives the reflected wave to reflection point P2 is obtained, and a sum of the distance from reflection point P3 to the transmission unit (that is, reception unit 12) and the distance from reception unit 13 that receives the reflected wave to reflection point P3 is obtained.

That is, there are obtained ellipsoidal surfaces at which objects (reflection points P1 to P3) are estimated to be present. Since reception unit 12 is also utilized as a transmission unit, the above ellipsoidal surface will have a distance between focal points that is 0 (that is, a spherical surface) for reception unit 12.

In the case where a reflected wave has been received by each of reception units 11 to 13, determination unit 2 calculates, as coordinates Q1, coordinates of a point further on the front side with respect to reception unit 12, out of the intersection of an ellipsoidal surface obtained from the reception time in reception unit 11 (hereinafter, referred to as a "first reception time"), a spherical surface obtained from the reception time in reception unit 12 (hereinafter, referred to as a "second reception time"), and a horizontal surface that includes reception unit 12. Moreover, determination unit 2 calculates, as coordinates Q2, coordinates of a point further on the front side with respect to reception unit 12, out of the intersection of a spherical surface obtained from the second reception time, an ellipsoidal surface obtained from the reception time in reception unit 13 (hereinafter, referred to as a "third reception time"), and a horizontal surface that includes reception unit 12.

Incidentally, coordinates Q1 are at a position (coordinates) of reflection point P1 (P2), under the assumption that reflection point P1 that reflects a reflected wave received by reception unit 11 and reflection point P2 that reflects a reflected wave received by reception unit 12 are the same, and this reflection point P1 (P2) is located on a same horizontal surface as reception unit 12. Similarly, coordinates Q2 are at a position (coordinates) of reflection point P2 (P3), under the assumption that second reflection point P2 and reflection point P3 that reflects a reflected wave received by reception unit 13 are the same, and this reflection point is located on a same horizontal surface as reception unit 12. Therefore, if the above assumptions are correct, coordinates Q1, coordinates Q2, and the positions of all of reflection points P1 to P3 coincide with one another, that is, the distance between coordinates Q1 and coordinates Q2 becomes 0.

Inversely, as the deviation from the above assumption increases, that is, as the distance between reflection point P1 and reflection point P3 increases, or as each of reflection points P1 to P3 moves away from reception unit 12 in an up-down direction (height direction), the distance between coordinates Q1 and coordinates Q2 increases. That is, in the case where the height of object 4 is lower than the height of reception units 11 to 13, the distance between coordinates Q1 and coordinates Q2 increases more than that in the case where the height of object 4 is higher than the height of reception units 11 to 13.

Accordingly, determination unit 2 compares the distance between coordinates Q1 and coordinates Q2 (hereinafter, referred to as a "determination distance") with a prescribed reference distance.

If the determination distance is less than the reference distance, determination unit 2 determines that object 4 is an obstacle (that is, object 4 needs to be avoided), such as the ball shown in FIG. 1. When it is determined that object 4 needs to be avoided, determination unit 2 outputs a prescribed electric signal (hereinafter, referred to as a "detection signal") to the outside. The detection signal is used, for example, as warning, or a trigger of automatic emergency brakes.

If the determination distance is equal to or larger than the reference distance, determination unit 2 determines that object 4 is not an obstacle, since object 4 has a height lower than the height of reception units 11 to 13 and can be driven over by vehicle 3.

According to the above configuration, by determining the presence or absence of an obstacle (whether or not the obstacle needs to be avoided) based on the determination distance, incorrect detections can be reduced, such as determining that object 4 needs to be avoided even though object 4 that reflects a transmission wave has a low height and does not need to be avoided.

Moreover, in the conventional object detection device, while low-height object 4 being incorrectly detected as an obstacle is avoided by reducing the detection range, in the present exemplary embodiment, as compared to a conventional object detection device, the occurrence of incorrect detections can be reduced without reducing the detection range.

Moreover, in the present exemplary embodiment, reception unit 11 and reception unit 13 are disposed at mutually different heights, as shown in FIG. 2 and FIG. 3. As a result, compared to the case where reception unit 11 and reception unit 13 are located at the same height (that is, on a same horizontal surface), the determination distance increases since the distance between first reflection point P1 and third reflection point P3 increases in the case of object 4 with a low height. Therefore, in the object detection device of the present exemplary embodiment, it is easier to determine that object 4 is not an obstacle. That is, the occurrence of incorrect detections, such as object 4 with a height capable of being driven over by vehicle 3 and not to be detected as an obstacle, being detected as an obstacle, can be reduced. Note that, while reception unit 11 is disposed at a position lower than reception unit 13 in FIG. 2 and FIG. 3, reception unit 11 may be disposed at a position higher than reception unit 13. In this case, in the case where reception units 11 to 14 needs to be arranged symmetrical in a left-right direction due to design or the like, both reception unit 11 and reception unit 14 may be disposed at positions higher than reception unit 12 and reception unit 13.

That is, the object detection device of the present exemplary embodiment described with reference to FIG. 1 includes a transmission unit (reception unit 12) for transmitting a transmission wave to a detection range, reception unit 11 for receiving a reflected wave resulting from the reflection of the transmission wave transmitted from the transmission unit (reception unit 12) by object 4 within the detection range, reception unit 12 for receiving a reflected wave resulting from the reflection of the transmission wave transmitted from the transmission unit (reception unit 12) by object 4 within the detection range, and reception unit 13 for receiving a reflected wave resulting from the reflection of the transmission wave transmitted from the transmission unit (reception unit 12) by object 4 within the detection range. The object detection device further includes determination unit 2 for determining the presence or absence of object 4 to be avoided, based on outputs of reception unit 11, reception unit 12, and reception unit 13.

Also, determination unit 2 calculates first coordinates Q1 at which object 4 is estimated to be present, based on a first reception time from when the transmission unit (reception unit 12) transmits a transmission wave until a reflected wave is received by reception unit 11, and a second reception time from when the transmission unit (reception unit 12) transmits a transmission wave until a reflected wave is received by reception unit 12. Further, determination unit 2 calculates second coordinates Q2 at which object 4 is estimated to be present, based on the second reception time, and a third reception time from when the transmission unit transmits a transmission wave until a reflected wave is received by reception unit 13.

Further, determination unit 2 compares a distance between first coordinates Q1 and second coordinates Q2 with a prescribed reference distance, determines that object 4 needs to be avoided in the case where the distance between first coordinates Q1 and second coordinates Q2 is less than the reference distance, and determines that object 4 does not need to be avoided in the case where the distance between first coordinates Q1 and second coordinates Q2 is equal to or larger than the reference distance.

Note that, in the present exemplary embodiment, reception unit 12 is used as a transmission unit.

(A Case where the Detected Object is a Wall)

Next, a case where an object that reflects a transmission wave output from the object detection device of the present exemplary embodiment is wide (that is, large in the left-right direction) object 4 such as a wall, will be described with reference to FIG. 4.

Figure 4:
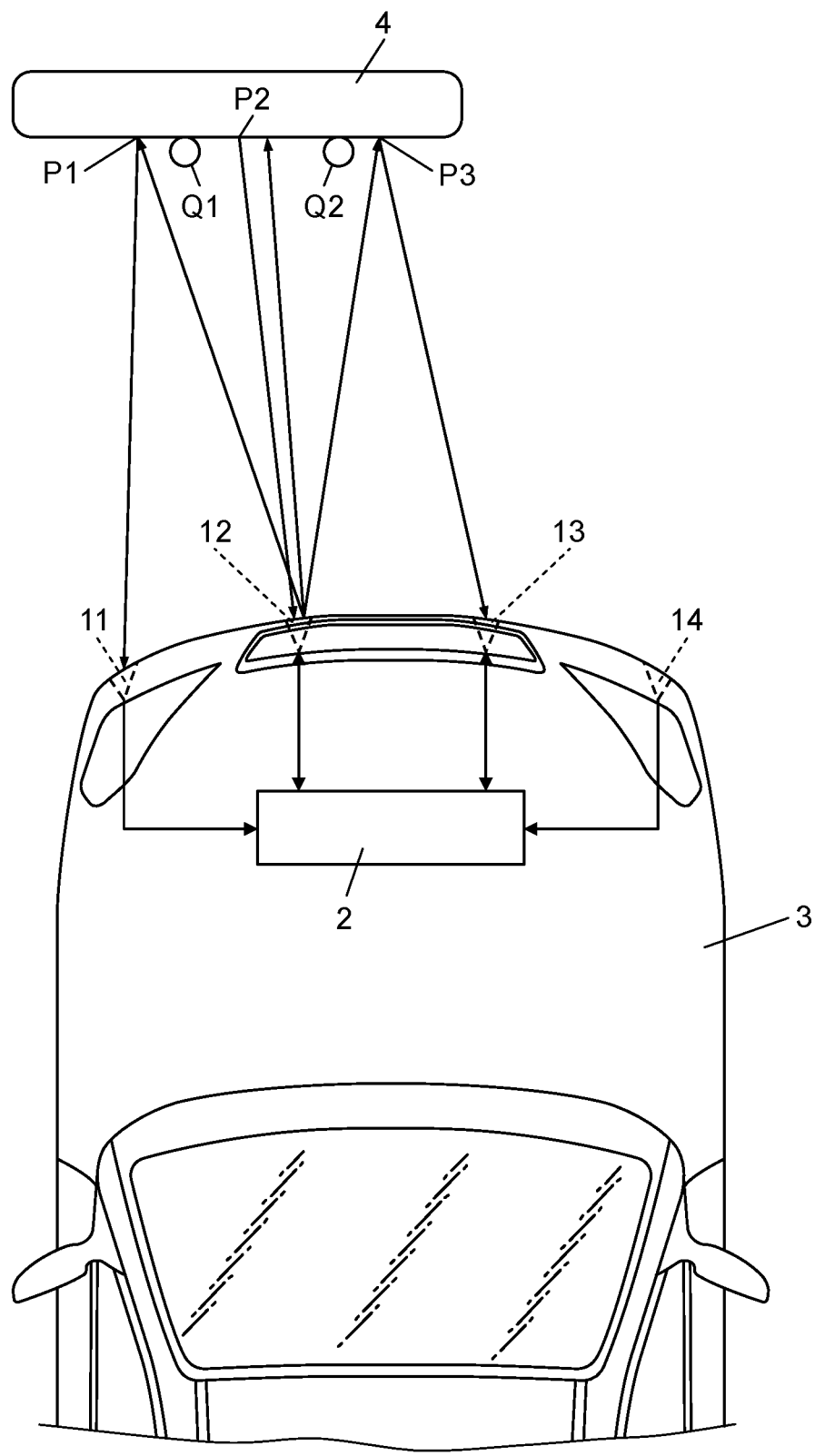
FIG. 4 is a diagram for describing an operation of the object detection device according to the exemplary embodiment.

FIG. 4 is a diagram for describing the operation, in an object detection device according to an exemplary embodiment of the present disclosure, in the case where object 4 that reflects a transmission wave is a wall.

Object 4 shown in FIG. 4 has a determination distance that is equal to or larger than the reference distance since a distance between reflection point P1 and reflection point P3 is large, even though object 4 has a high height and needs to be avoided. However, in the above case, the strength of a reflected wave (a peak value of the output voltages of reception units 11 to 13) is increased more than that in the case of object 4 with a low height that can be driven over by vehicle 3. Accordingly, in order to reduce detection omissions where it is determined that object 4 such as the wall is not an obstacle, determination unit 2 compares the peak value of the output voltage of each of reception units 11 to 13 (the strength of a reflected wave) with a reference threshold. Also, object 4 is determined to be an obstacle if the peak value of the output voltages of all of reception units 11 to 13 is equal to or higher than the reference threshold, even if the determination distance is equal to or larger than the reference distance. In other words, determination unit 2 determines that object 4 is not an obstacle, in the case where the determination distance is equal to or larger than the reference distance, and the peak value of the output voltage in any one of reception units 11 to 13 is less than the reference threshold. The above reference threshold is the value at which the strength of a reflected wave (a peak value of the output voltages of reception units 11 to 13) in object (obstacle) 4 to be avoided is estimated to exceed, and is set higher than a reception threshold used for determination of a reception timing. Moreover, the strength of a reflected wave in object 4 with a height lower than the height of reception units 11 to 13 decreases as the distance with object 4 increases, if the distance with object 4 is equal to or larger than a certain distance. However, the strength decreases as the distance with object 4 decreases, if the distance with object 4 is equal to or smaller than a certain distance, due to the directivity of each of reception units 11 to 13. Accordingly, determination unit 2 changes the reference threshold in accordance with the distance with object 4.

Specifically, determination unit 2 derives the reference threshold by using at least one of the first reception time, the second reception time, and the third reception time. A table may be used, or a computation may be used, for the derivation of the reference threshold. If the above configuration is adopted, detection omissions can be reduced, in which object 4 such as a wall is determined as not an obstacle.

That is, in the object detection device of the present exemplary embodiment, more preferably, determination unit 2 derives a reference threshold at which the strength of a reflected wave in object 4 to be avoided is estimated to exceed, by using at least one of the first reception time, the second reception time, and the third reception time.

In addition, even if the distance between first coordinates Q1 and second coordinates Q2 is equal to or larger than the reference distance, determination unit 2 determines that object 4 needs to be avoided in the case where the strength of a reflected wave received by reception unit 11, the strength of a reflected wave received by reception unit 12, and the strength of a reflected wave received by reception unit 13 are all equal to or higher than the reference threshold.

Figure 5:
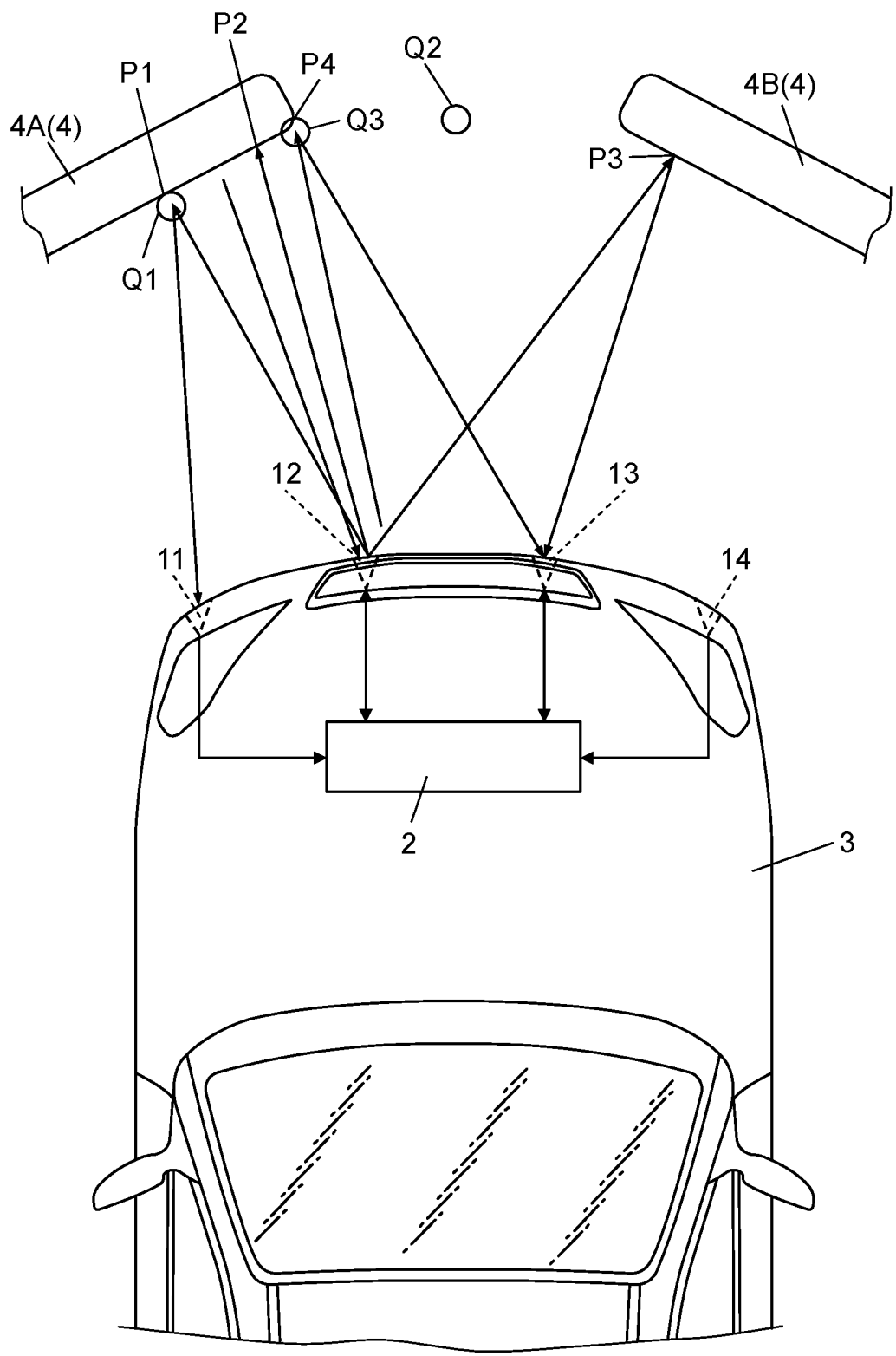
FIG. 5 is a diagram for describing an operation of the object detection device according to the exemplary embodiment.

Moreover, as a case where the determination distance is equal to or larger than the reference distance even though object 4 is an obstacle, a case can be considered where object 4A having first reflection point P1 and object 4B having third reflection point P3 are separated from each other and there is a space between first reflection point P1 and third reflection point P3 as shown in FIG. 5. In such a case, since the strength of a reflected wave decreases, it cannot be determined as low-height object 4, even if the reference threshold as mentioned above is used. However, in such a case, reflected waves are received a plurality of times by each of reception units 11 to 13 for one transmission wave. Accordingly, determination unit 2 calculates third coordinates Q3 by using the time from when the transmission wave is transmitted until a timing when an nth reflected wave (n is a prescribed integer of 2 or more) is received by third reception unit 13 (that is, a timing when a number of times the output voltage of reception unit 13 once falls below the reception threshold and again exceeds a reception threshold becomes n−1 times) (hereinafter, referred to as a "fourth reception time"), and the second reception time. The calculation of third coordinates Q3 is performed similarly to the calculation of second coordinates Q2, except that the fourth reception time is used instead of the third reception time. In addition, determination unit 2 calculates a distance between first coordinates Q1 and third coordinates Q3 (hereinafter, referred to as a "second determination distance"), and determines that object 4 needs to be avoided (that is, object 4 is an obstacle) if the second determination distance is less than the reference distance, even if the determination distance is equal to or larger than the reference distance. If the above configuration is adopted, detection omissions can be reduced, such as determining that object 4 does not need to be avoided (that is, object 4 is not an obstacle) due to increase in the determination distance in the case where a plurality of objects 4 are present or the like.

That is, in the object detection device of the present exemplary embodiment, more preferably, determination unit 2 calculates third coordinates Q3 at which object 4 is estimated to be present, based on the second reception time, and a fourth reception time from when the transmission unit (reception unit 12) transmits a transmission wave until a prescribed number of 2 times or more of reflected waves are received by reception unit 13. Additionally, determination unit 2 determines that object 4 needs to be avoided, in the case where a distance between third coordinates Q3 and first coordinates Q1 is less than the reference distance, even in the case where a distance between first coordinates Q1 and second coordinates Q2 is equal to or larger than the reference distance.

(A Case where there are Two Detected Objects)

Next, a case where object 4 that reflects a transmission wave output from the object detection device of the present exemplary embodiment is separated into two, will be described with reference to FIG. 5.

Moreover, as already described above, in the present exemplary embodiment, an operation for using reception unit 13 as a transmission unit is also possible. In the case where reception unit 13 is used as a transmission unit, the operation is an operation common to the above description except that reception unit 12 is used instead of reception unit 11 in the above description and that reception unit 14 is used instead of reception unit 13 in the above description, and thus a description will be omitted.

As is clear from the above description, according to the object detection device of the present disclosure, the occurrence of incorrect detections can be reduced, such as determining that an object needs to be avoided even though the object that reflects a transmission wave has a low height and does not need to be avoided. Moreover, as compared to a conventional object detection device that reduces the occurrence of incorrect detections of an object as described above by reducing the detection range, the object detection device of the present disclosure can reduce the occurrence of incorrect detections without reducing the detection range.

REFERENCE MARKS IN THE DRAWINGS 2 determination unit
4, 4A, 4B object
11, 12, 13, 14 reception unit
Q1, Q2, Q3 coordinates

The invention claimed is:

1. An object detection device comprising:
a transmitter that transmits a transmission wave to a detection range;
a first receiver that receives a reflected wave resulting from reflection of the transmission wave transmitted from the transmitter by at least one object within the detection range;
a second receiver that receives a reflected wave resulting from reflection of the transmission wave transmitted from the transmitter by the at least one object within the detection range;
a third receiver that receives a reflected wave resulting from reflection of the transmission wave transmitted from the transmitter by the at least one object within the detection range; and
a micro controller that determines presence or absence of an object to be avoided, based on outputs of the first receiver, the second receiver, and the third receiver,
wherein the micro controller
calculates first coordinates at which the at least one object is estimated to be present, based on a first reception time from when the transmitter transmits a transmission wave until a reflected wave is received by the first receiver, and a second reception time from when the transmitter transmits a transmission wave until a reflected wave is received by the second receiver,
calculates second coordinates at which the at least one object is estimated to be present, based on the second reception time, and a third reception time from when the transmitter transmits a transmission wave until a reflected wave is received by the third receiver, and
compares a distance between the first coordinates and the second coordinates with a prescribed reference distance, determines that the at least one object includes the object to be avoided in a case where the distance between the first coordinates and the second coordinates is less than the reference distance, and determines that the at least one object does not include the object to be avoided in a case where the distance between the first coordinates and the second coordinates is equal to or larger than the reference distance.

2. The object detection device according to claim 1, wherein the second receiver is used as the transmitter.

3. The object detection device according to claim 1, wherein
the micro controller
calculates third coordinates at which the at least one object is estimated to be present, based on the second reception time, and a fourth reception time from when the transmitter transmits a transmission wave until a prescribed number of two times or more of reflected waves are received by the third receiver,
and determines that the at least one object includes the object to be avoided in a case where a distance between the third coordinates and the first coordinates is less than the reference distance, even in the case where the distance between the first coordinates and the second coordinates is equal to or larger than the reference distance.

4. The object detection device according to claim 1, wherein
the micro controller derives a reference threshold at which a strength of a reflected wave in the object to be avoided is estimated to exceed, by using at least one of the first reception time, the second reception time, and the third reception time, and
the micro controller determines that the at least one object includes the object to be avoided, in a case where a strength of a reflected wave received by the first receiver, a strength of a reflected wave received by the second receiver, and a strength of a reflected wave received by the third receiver are all equal to or higher than the reference threshold, even in the case where the distance between the first coordinates and the second coordinates is equal to or larger than the reference distance.

5. The object detection device according to claim 1, wherein the first receiver and the third receiver are disposed at mutually different heights.

* * * * *